US008715075B2

(12) United States Patent
Nguyen

(10) Patent No.: US 8,715,075 B2
(45) Date of Patent: *May 6, 2014

(54) METHOD OF GAMING, A GAMING SYSTEM AND A GAME CONTROLLER

(75) Inventor: Hung Ngoc Nguyen, Sefton (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/453,377

(22) Filed: Apr. 23, 2012

(65) Prior Publication Data

US 2012/0329545 A1 Dec. 27, 2012

Related U.S. Application Data

(63) Continuation of application No. 12/338,224, filed on Dec. 18, 2008, now Pat. No. 8,182,330.

(30) Foreign Application Priority Data

Dec. 21, 2007 (AU) ................................ 2007907049

(51) Int. Cl.
*A63F 9/24* (2006.01)
*A63F 13/00* (2014.01)

(52) U.S. Cl.
USPC ................................. 463/31; 463/20; 463/32

(58) Field of Classification Search
USPC ...................................................... 463/20, 31
See application file for complete search history.

(56) References Cited

U.S. PATENT DOCUMENTS

| | | | | |
|---|---|---|---|---|
| 4,299,388 | A | 11/1981 | Resch et al. | |
| 5,031,918 | A | 7/1991 | Brill | |
| 6,672,960 | B1 | 1/2004 | B-Jensen | |
| 7,878,903 | B2 * | 2/2011 | Chan | 463/31 |
| 2004/0171423 | A1 | 9/2004 | Silva et al. | |
| 2006/0128465 | A1 | 6/2006 | Schultz et al. | |
| 2008/0171587 | A1 * | 7/2008 | Jackson | 463/20 |
| 2009/0233685 | A1 | 9/2009 | Nguyen | |
| 2009/0286588 | A1 * | 11/2009 | Jackson | 463/20 |

FOREIGN PATENT DOCUMENTS

| | | |
|---|---|---|
| CA | 2230983 | 9/1999 |
| JP | 6285236 | 10/1994 |
| JP | 2002045497 | 2/2002 |
| JP | 2002325885 | 11/2002 |
| JP | 2003000823 | 1/2003 |

(Continued)

OTHER PUBLICATIONS

United States Patent and Trademark Office, "Notice of Allowance," issued in connection with U.S. Appl. No. 12/338,224, mailed on Jan. 24, 2012, 8 pages.

(Continued)

*Primary Examiner* — Steven J Hylinski

(74) *Attorney, Agent, or Firm* — Hanley, Flight and Zimmerman, LLC

(57) ABSTRACT

A method of gaming comprising: selecting in each game round a plurality of symbols for display to a player in a set of display positions; superimposing a distorting element over one or more of the display positions so that one or more of the symbols can be modified, in response to determining that the distorting element should appear; and determining an outcome for each game round based on the selected symbols as modified by the distorting element.

41 Claims, 8 Drawing Sheets

(56) References Cited

FOREIGN PATENT DOCUMENTS

| | | |
|---|---|---|
| JP | 2003199910 | 7/2003 |
| JP | 2004089395 | 3/2004 |
| JP | 2006341000 | 12/2006 |
| JP | 2006341211 | 12/2006 |
| JP | 2006346340 | 12/2006 |
| JP | 2007000658 | 1/2007 |
| JP | 2007014690 | 1/2007 |
| JP | 2007021074 | 2/2007 |
| JP | 2007021089 | 2/2007 |
| JP | 2007044376 | 2/2007 |
| JP | 20070044375 | 2/2007 |
| JP | 2007105287 | 4/2007 |
| WO | 03083798 | 10/2003 |

OTHER PUBLICATIONS

United States Patent and Trademark Office, "Non-Final Office Action," issued in connection with U.S. Appl. No. 12/338,224, mailed on Jun. 28, 2011, 18 pages.

* cited by examiner

METHOD OF GAMING, A GAMING SYSTEM AND A GAME CONTROLLER

CROSS-REFERENCE TO RELATED APPLICATIONS

The present application claims the benefit of priority to U.S. patent application Ser. No. 12/338,224, filed on Dec. 18, 2008, entitled "A METHOD OF GAMING, A GAMING SYSTEM AND A GAME CONTROLLER", which claims the benefit of priority to Australian Provisional Patent Application No. 2007907049, filed on Dec. 21, 2007, entitled "A METHOD OF GAMING, A GAMING SYSTEM AND A GAME CONTROLLER", each of which is herein incorporated by reference in its entirety.

FIELD

The present invention relates to a method of gaming, a gaming system and a game controller.

BACKGROUND TO THE INVENTION

Gaming systems are known comprising a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine with selected symbols are displayed in virtual reels on a video display.

It is known to provide features whereby, on a trigger condition, symbols are expanded.

While such systems provide users with enjoyment, there is a need for alternative gaming systems with different features offering light hearted excitement to the player with appealing visual effects.

SUMMARY OF THE INVENTION

According to a first aspect of the invention there is provided a method of gaming including:

- selecting in each game round a plurality of symbols for display to a player in a set of display positions;
- superimposing a distorting element over one or more of the display positions so that one or more of the symbols can be modified, in response to determining that the distorting element should appear; and
- determining an outcome for each game round based on the selected symbols as modified by the distorting element.

In one embodiment, subsets of the display positions correspond to respective ones of a plurality of reels set side by side, each subset including a plurality of visible reel positions on spinning reels.

In one embodiment the modification is based on a current state of a range of possible states of the distorting element. In an embodiment one or more game states influence the current state of the distorting element. An embodiment further includes the step of retaining the distorting element in a subsequent game round and the one or more game states which influence the current state of the distorting element includes the game round outcome of a previous game round.

In one embodiment the range of possible states of the distorting element includes a range of levels of liquid in the glass optically distorting any symbols superimposed by the liquid. In an embodiment the range of possible states of the distorting element further includes a range of positions of the glass. In an embodiment the range of possible states of the distorting element further includes a range of tilting angles of the glass. In an embodiment the range of possible states of the distorting element further includes an over-full state with distorting droplets escaping from the glass. In an embodiment the range of possible states of the distorting element further includes an empty state with no liquid and no optically distorted symbols.

In one embodiment the step of determining the outcome includes a step of determining whether any symbols are distorted so as to cover adjacent display positions as well as an original display position and treating such symbols as occupying both the original and adjacent display positions.

In one embodiment the step of determining the outcome further includes a step of determining whether the liquid completely fills the glass, and adjusting prizes in response to the filled glass.

In one embodiment the step of determining that a distorting element should appear is controlled by a random event, player choice, or occurrence of a particular winning combination of symbols.

In one embodiment the current state of the distorting element is influenced by a random event or player choice.

According to a second aspect of the invention there is provided a gaming system including:

- a display for symbols to be displayed at a set of display positions to a player;
- a symbol selector for selecting in each game round a plurality of symbols for display to the player in a set of display positions;
- a distorting element controller for superimposing a distorting element over one or more of the display positions so that one or more of the symbols can be modified, in response to determining that the distorting element should appear; and
- an outcome generator arranged to determine an outcome for each game round based on the selected symbols as modified by the distorting element.

In one embodiment, subsets of the display positions correspond to respective ones of a plurality of reels set side by side, each subset including a plurality of visible reel positions on spinning reels.

In one embodiment the distorting element controller is arranged so that the modification is based on a current state of a range of possible states of the distorting element. In an embodiment the distorting element controller is arranged so that one or more game states influence the current state of the distorting element.

In one embodiment the distorting element controller is arranged so that the distorting element can be retained in a subsequent game round and the one or more game states which influence the current state of the distorting element includes the game round outcome of a previous game round.

In one embodiment the distorting element controller is arranged so that the distorting element is an image of a glass and the range of possible states of the distorting element includes a range of levels of liquid in the glass optically distorting any symbols superimposed by the liquid. In an embodiment the range of possible states of the distorting element further includes a range of positions of the glass. In an embodiment the range of possible states of the distorting element further includes a range of tilting angles of the glass. In the range of possible states of the distorting element further includes an over-full state with distorting droplets escaping from the glass. In an embodiment the range of possible states of the distorting element further includes an empty state with no liquid and no optically distorted symbols.

In one embodiment the outcome generator is arranged to determine whether one or more symbols are distorted so as to cover adjacent display positions as well as an original display position and to treat such symbols as occupying both the original and adjacent display positions in determining the outcome.

In one embodiment the outcome generator is arranged to determine whether the liquid completely fills the glass, and to adjust prizes in response to the filled glass.

In one embodiment the distorting element controller is arranged to determine that a distorting element should appear on the basis of one or more of a random event, player choice, or occurrence of a particular winning combination of symbols.

In one embodiment the distorting element controller is arranged so that the current state of the distorting element is influenced by one or more of a random event or player choice.

According to a third aspect of the invention there is provided a game controller including:

- a symbol selector for selecting in each game round on a gaming system a plurality of symbols for display to a player in a set of display positions on a display;
- a distorting element controller for superimposing a distorting element over one or more of the display positions so that one or more of the symbols can be modified, in response to determining that the distorting element should appear; and
- an outcome generator arranged to determine an outcome for each game round based on the selected symbols as modified by the distorting element.

In one embodiment the distorting element controller is arranged so that the modification is based on a current state of a range of possible states of the distorting element.

In one embodiment the distorting element controller is arranged so that one or more game states influence the current state of the distorting element.

In one embodiment the distorting element controller is arranged so that the distorting element can be retained in a subsequent game round and the one or more game states which influence the current state of the distorting element includes the game round outcome of a previous game round.

In one embodiment the distorting element controller is arranged so that the distorting element is an image of a glass and the range of possible states of the distorting element includes a range of levels of liquid in the glass optically distorting any symbols superimposed by the liquid. In an embodiment the range of possible states of the distorting element further includes a range of positions of the glass. In an embodiment the range of possible states of the distorting element further includes a range of tilting angles of the glass. In an embodiment the range of possible states of the distorting element further includes an over-full state with distorting droplets escaping from the glass. In one embodiment the range of possible states of the distorting element further includes an empty state with no liquid and no optically distorted symbols.

In one embodiment the outcome generator is arranged to determine whether one or more symbols are distorted so as to cover adjacent display positions as well as an original display position and to treat such symbols as occupying both the original and adjacent display positions in determining the outcome.

In one embodiment the outcome generator is arranged to determine whether the liquid completely fills the glass, and to adjust prizes in response to the filled glass.

In one embodiment the distorting element controller is arranged to determine that a distorting element should appear on the basis of one or more of a random event, player choice, or occurrence of a particular winning combination of symbols.

In one embodiment the distorting element controller is arranged so that the current state of the distorting element is influenced by one or more of a random event or player choice.

According to a fourth aspect of the invention there is provided computer program code when executed by a computer causes the computer to implement any of the embodiments of the method of gaming of the first aspect of the invention.

According to a fifth aspect of the invention there is provided a computer readable medium including the program code of the fourth aspect of the invention.

According to a sixth aspect of the invention there is provided a data signal including the computer readable program code of the fourth aspect of the invention.

In a seventh aspect, the invention extends to transmitting the computer readable program code of the fourth aspect of the invention.

BRIEF DESCRIPTION OF DRAWINGS

Certain embodiments of the invention will now be described by way of example in relation to the following drawings, in which.

Figure 1:
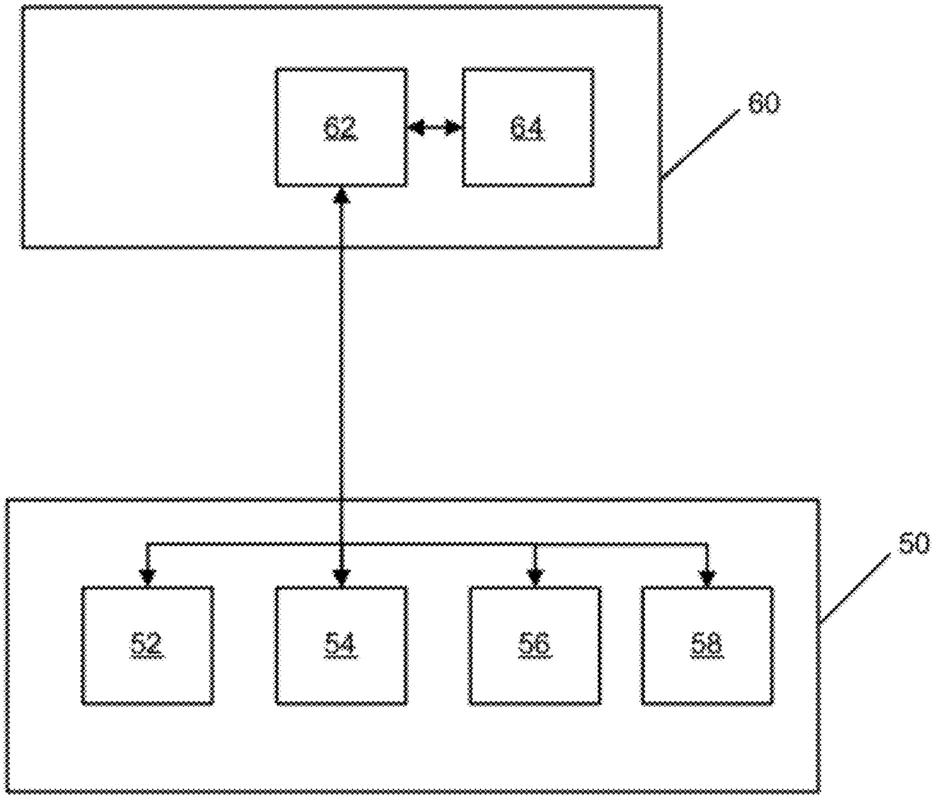
FIG. 1 is a block diagram of the core components of a gaming system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Referring to the drawings, there is shown a gaming system having a game controller arranged to implement a game wherein a distortion element is superimposed over one or more display positions which may modify the underlying symbols. In some embodiments, the state of the distortion element can take one of a range of states. In an embodiment, the modification is to make one or more adjacent symbols into the same symbol.

The gaming system may take a number of different forms. In a first form, a stand alone gaming machine is provided wherein all or most components for implementing the game are present in a player operable gaming machine.

In a second form, a distributed architecture is provided wherein some of the components for implementing the game are present in a player operable gaming machine and some of the components for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
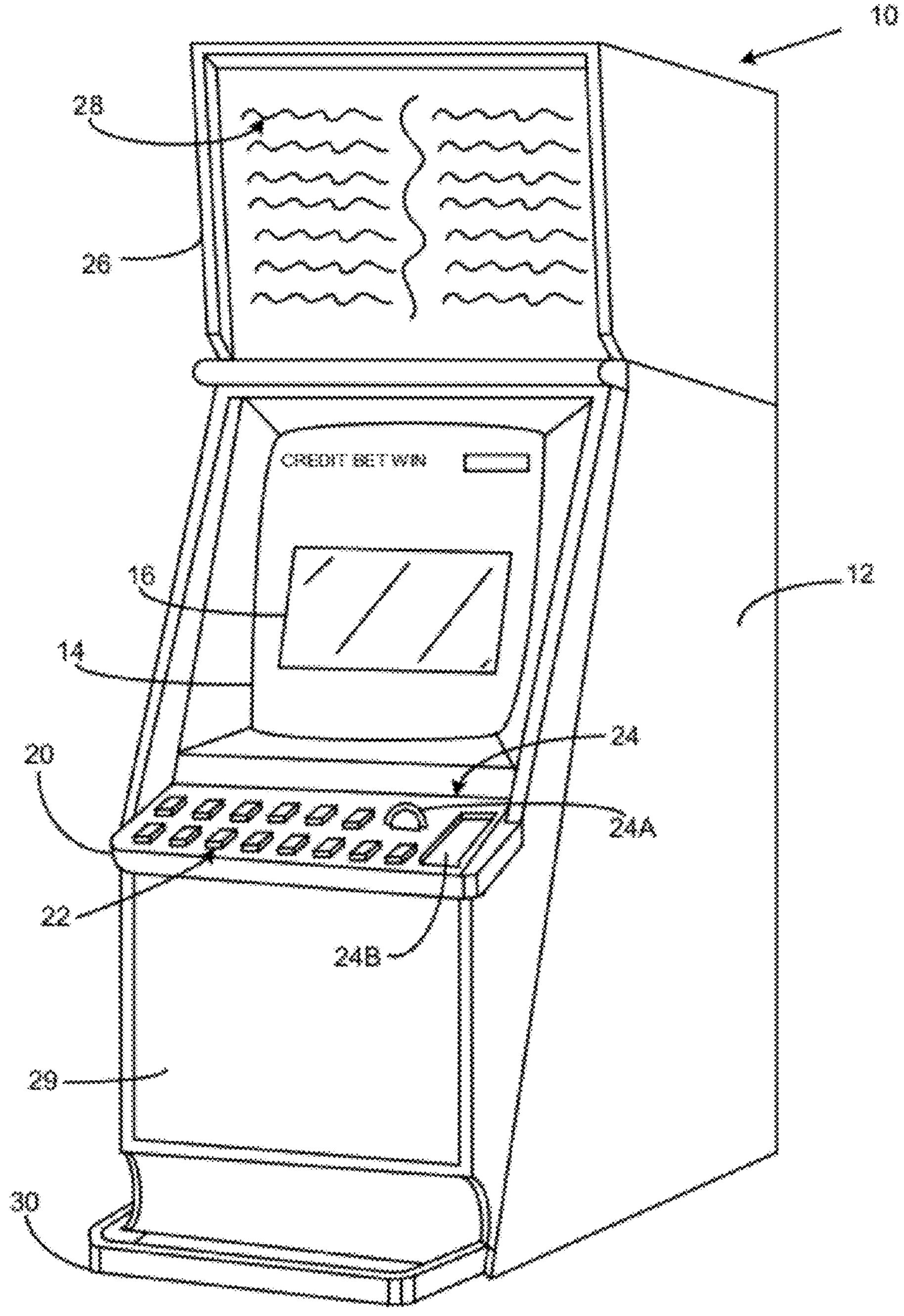
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
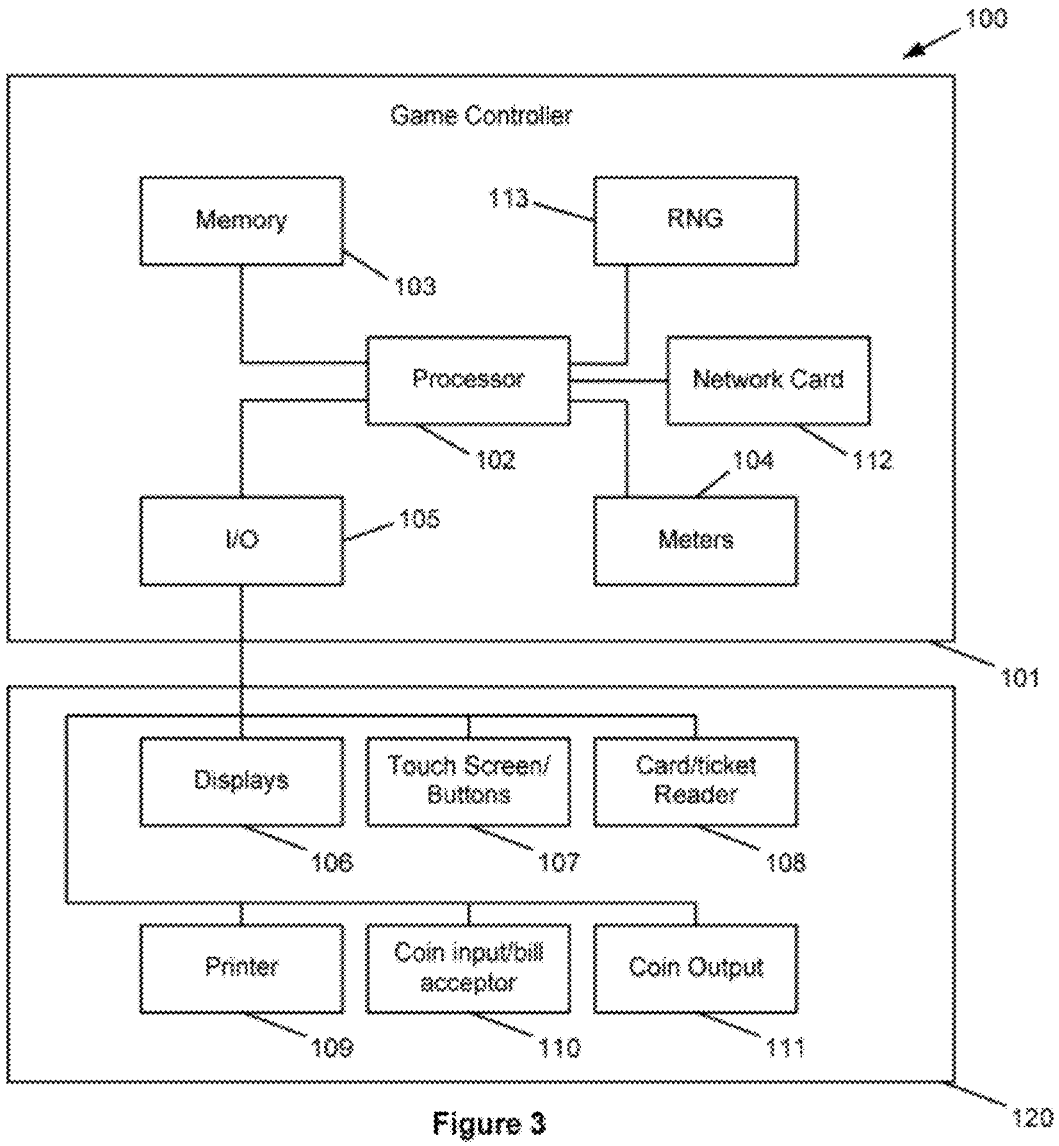
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 and includes one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
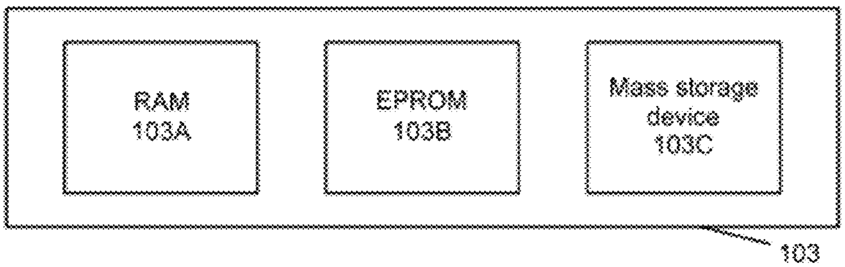
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
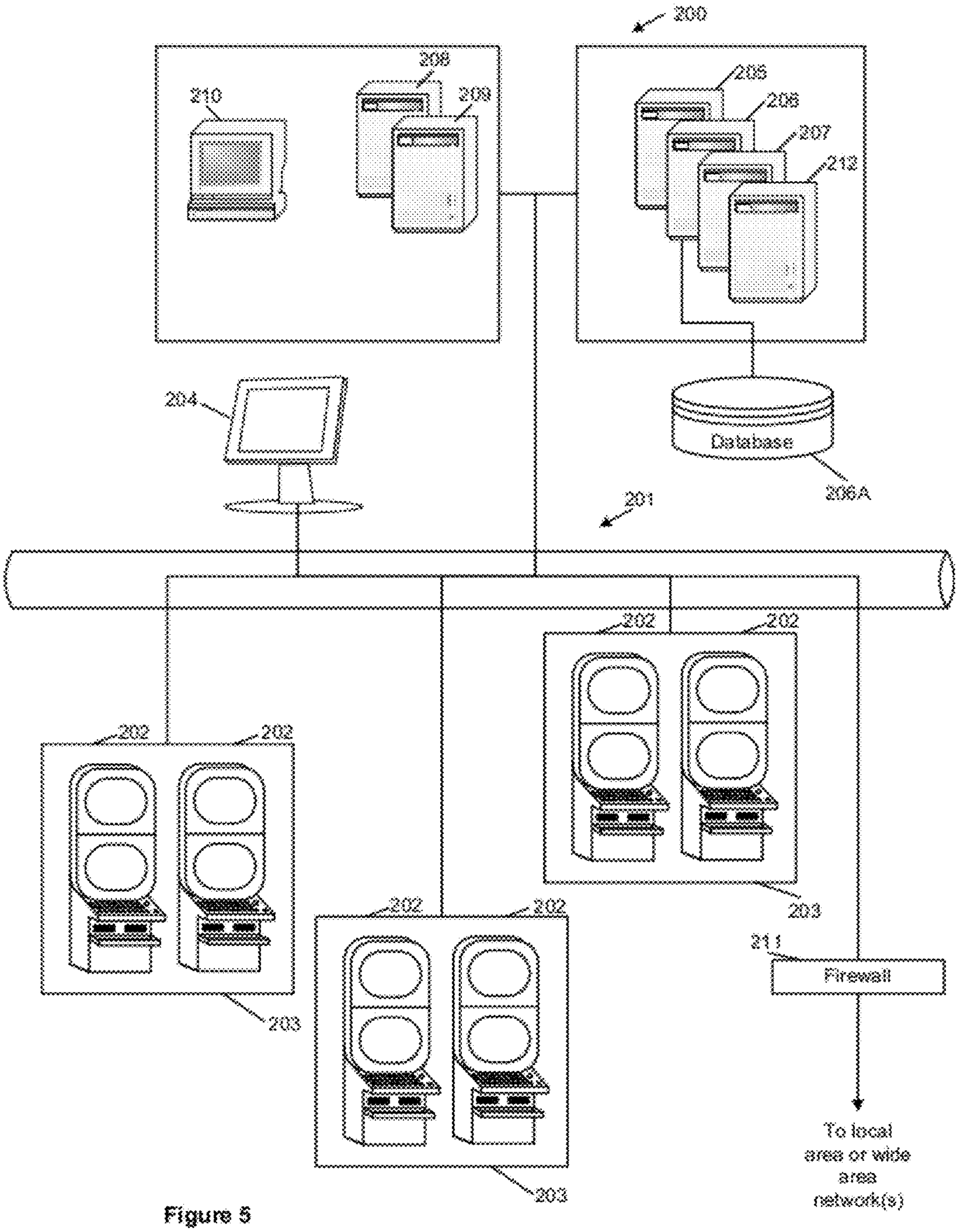
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games depending upon the terminals.

Embodiments of the invention relate to gaming systems for implementing games that involve a display of spinning reels as part of the display of the outcome of the game.

The game controllers of such gaming systems have a stop determining function that determines the stop position for each reel. For example, if there are five reels, each having twenty symbols, the stop determining function might determine that the stop positions are positions: 3, 13, 7, 9 and 17. The spinning of the reels is then controlled so that each symbol comes to a stop in the same row, typically a predetermined row in a "window" corresponding to a "single win line" game. When a reel stops, the symbols will be in one of a plurality of possible symbol positions for that reel relative to the stop position.

Exemplary embodiments of the present invention relate to gaming systems that allow a player to select how many win lines of a plurality of win lines they will play in each game—i.e. a minimum of one win line up to the maximum number of win lines allowed by the game. Each win line is formed by a set of symbol positions consisting of one symbol position from each reel. That is, a predetermined symbol position of each reel is assigned to a win line. The symbol positions that constitute each of the win lines are usually advertised to the player by markings on the display or diagrams showing the symbol positions that correspond to each win line. The win lines may be for example, horizontal or diagonal lines.

Figure 6:
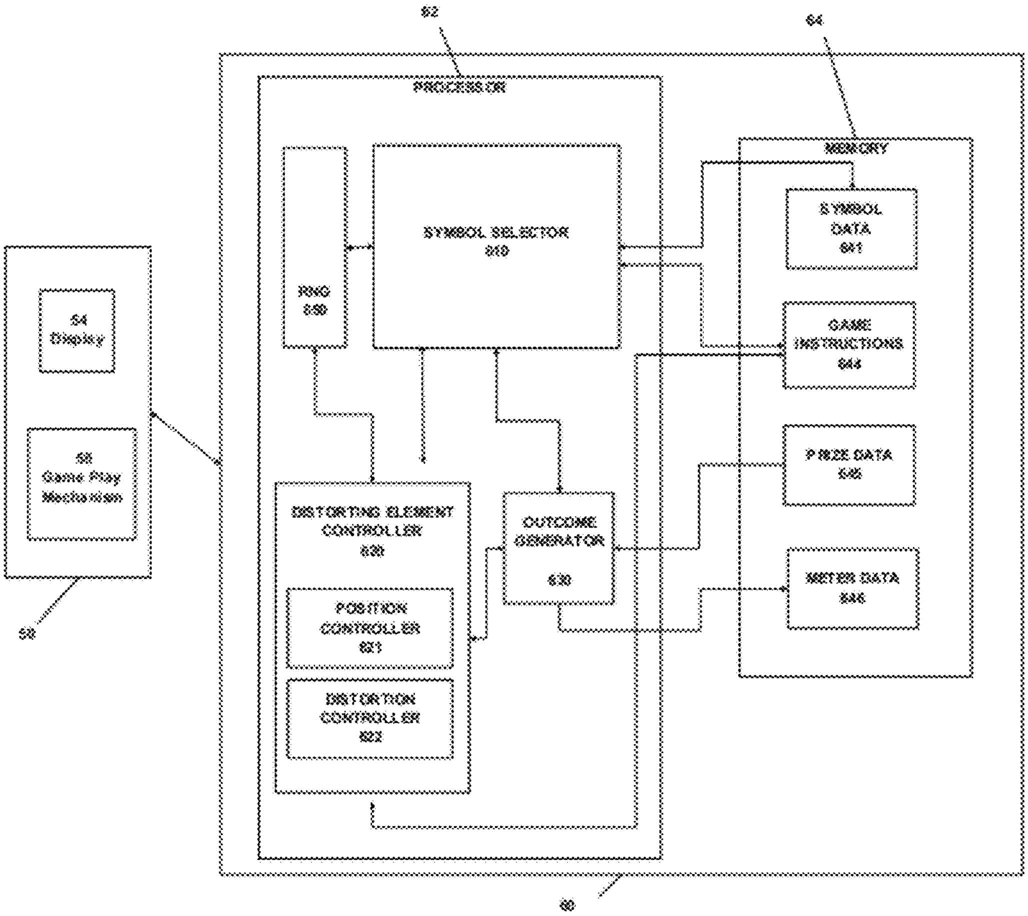
FIG. 6 is a further block diagram of the gaming system.

The game controller of one embodiment is shown in more detail in FIG. 6. The game controller 60 incorporates a processor 62 which implements a symbol selector 610, random number generator 650, distorting element controller 620 and outcome generator 630 based on program code stored in memory 64. Persons skilled in the art will appreciate that one or more of these components could be provided in other ways, for example by a dedicated circuit.

Symbol selector 610 selects symbols from symbol data 641 using random numbers from random number generator 650, to appear at display positions on the display 54. For example, by selecting stop positions for a plurality of reels defined by symbol data 641 such that subsets of the display positions correspond to respective ones of a plurality of reels set side by side, each subset including a plurality of visible reel positions on spinning reels.

When triggered by an event in accordance with game instructions 644, distorting element controller 620 operates to cause an image of a distorting element such as a part-filled spirit glass to appear on the display, in a position determined by position controller 621 and with a level of fluid controlled by distortion controller 622. In one example, distortion controller 621 initially begins display of the distortion element in an undistorted state (glass empty) and each time a certain type of win occurs (e.g. based on a specific symbol combination), distortion controller 621 adds some clear or translucent fluid to the glass, behind which the image of one or more underlying symbols is displayed as distorted. That is, it will be appreciated that the distortion is an optical distortion.

The outcome generator 630 calculates any prize associated with the current game round depending on game instructions 644, prize data 645 and any current modifications to underlying symbols caused by the distortion element, and updates meter data 646. The outcome generator 630 then updates meters, and displays any win on display 54 on the player interface 50, taking account of the effect of any distortions. In one example, any symbol on which the distortion element is superimposed is enlarged. In one example, an enlarged symbol increases any prize attributed to that symbol such as any symbol combinations including the symbol. In another example, the enlarged symbol "expands" by an optical magnification effect such that it is duplicated at a neighbouring position.

Any of the known rules for controlling the occurrence of feature in a game may be used to control when the distorting element appears, for example, the glass may always appear as part of each game round, the glass may only appear when certain types of bet are made, or the glass may appear when a trigger event occurs, such as a particular symbol or combination of symbols, a turnover amount, or an external event. Similar events may control the state of the distorting element. The distorting element may also only appear during certain parts of the game, for example during a series of free spins.

Figure 7:
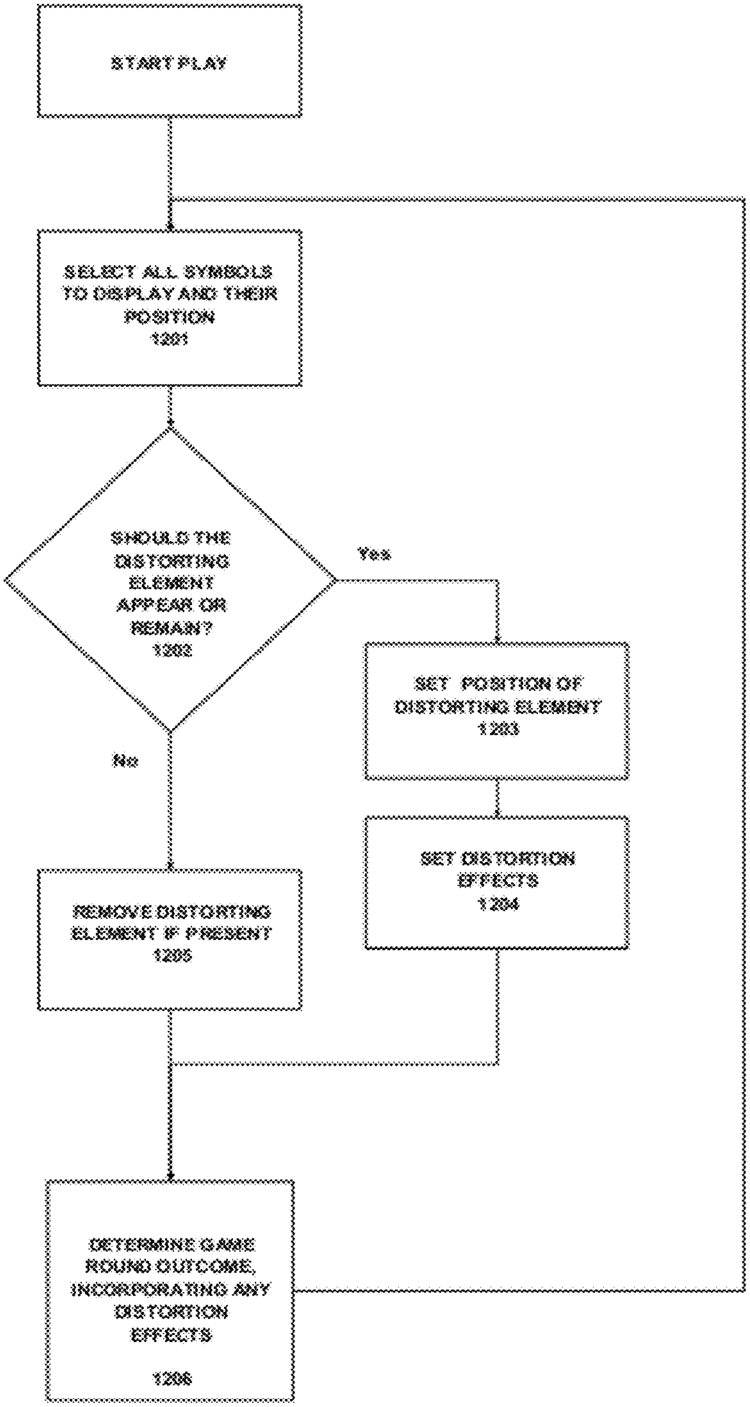
FIG. 7 shows a flow diagram for the method of an embodiment of the invention.

Now referring to FIG. 7, a flow diagram for an embodiment of the invention is shown. The step of symbol selection 1201 is to select the symbols for display. The system then performs the step 1202 of determining whether a distorting element should appear or remain. If the answer is "yes", in step 1203 the position controller 621 sets the position of the distorting element (e.g. a spirit glass) on the display 54, and in step 1204 the distortion controller 621 determines the amount of distortion, as represented by the fluid level in the spirit glass. If the answer is "no", the distorting element is removed from the display 54 if present. In step 1206, the outcome generator 630 determines an outcome for the game round taking into account any distortion effects, and a new game round begins in step 1201. Other features of the method will be apparent from the above description of the gaming system.

Persons skilled in the art will be able to conceive other distorting elements, for example a magnifying glass or other optical element could be a distorting element. Further, the state of the distorting element need not necessarily be analogous to filling a glass, in other embodiments, the size of the distorting element could change depending on state.

Example 1

Figure 8:
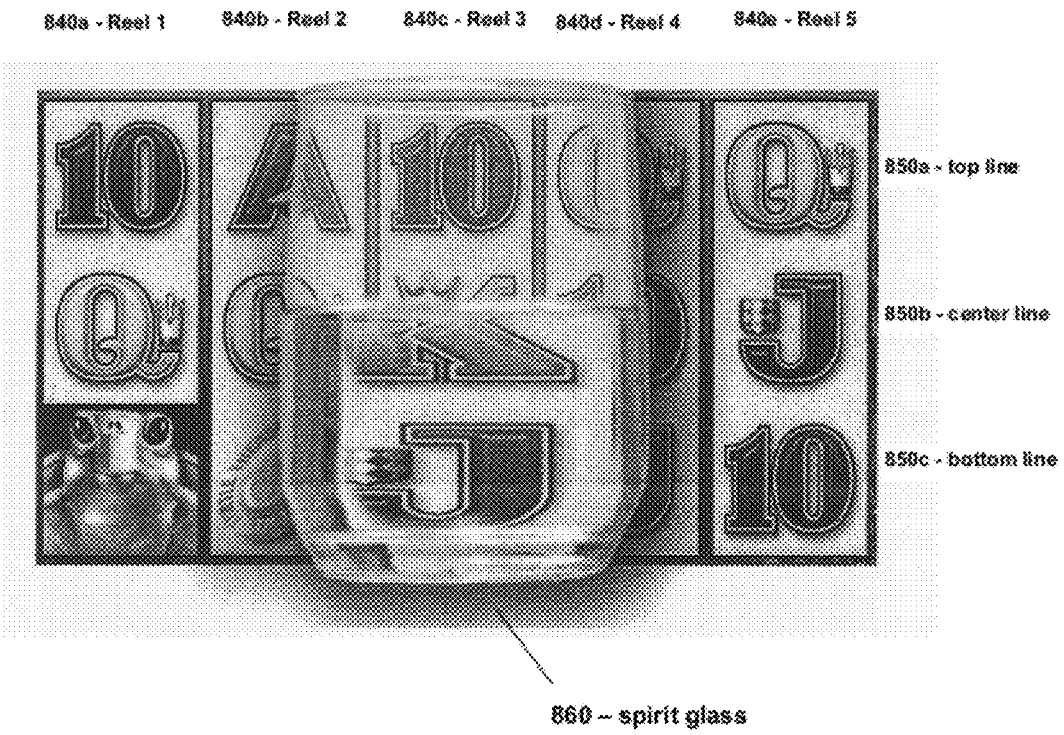
FIG. 8 shows the displays of Example 1.

Now referring to FIG. 8, one example of the method of the invention is shown. The display is divided into 5 reels 840*a* to 840*e* numbered 1 to 5 from left to right each displaying 3 symbols in a visible reel window, arranged into top line 850*a*, centre line 850*b* and bottom line 850*c* such that there are 15 display positions in total. Play involves a series of game rounds with a spirit glass 860 appearing in front of reel 3 partly obscuring the symbols, with the symbols in reel 3, centre and bottom lines appearing enlarged in a lateral direction to mimic refraction in the clear liquid part-filling the glass.

The prize is now evaluated by outcome generator 630. None of the distorted symbols completely covers adjacent symbols and the game rules 644 specify that no change is made to the game outcome, which in this case results in no prize.

Example 2

Figure 9:
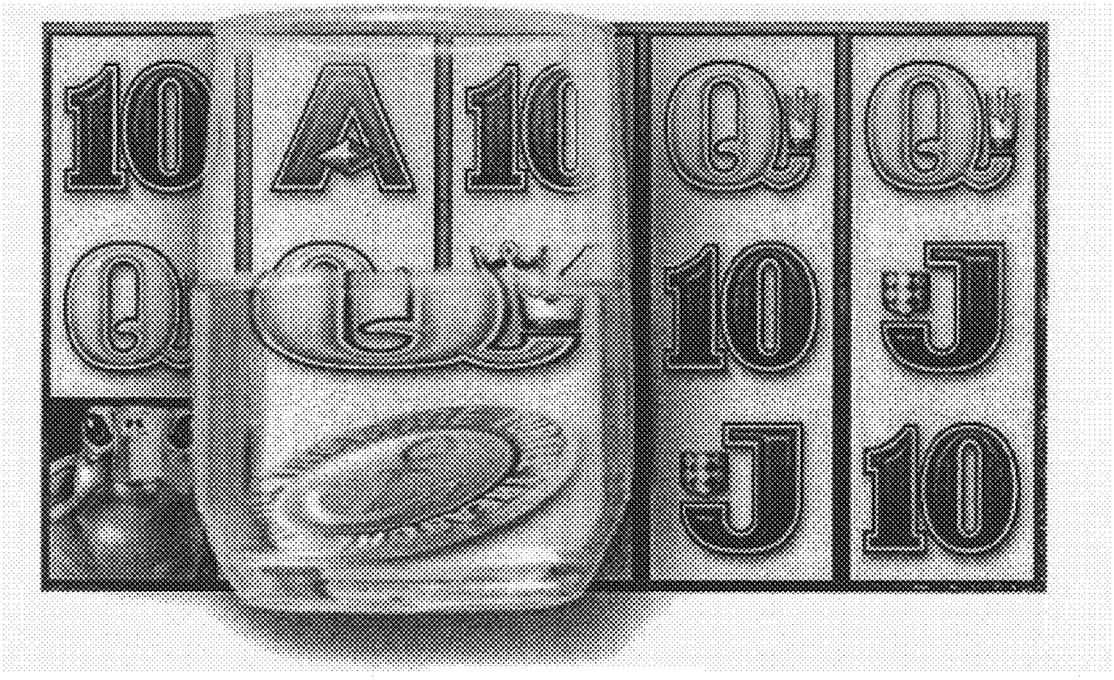
FIG. 9 shows the displays of Example 2.

Now referring to FIG. 9, another example is shown as a variant on the play of example 1. The position controller 621 has placed the spirit glass so that it is superimposed over reels 2 and 3. Under control of the distortion controller 622, the distortion element distorts the symbols in reel 2, centre and bottom lines, by such an extent that they completely obscure the adjacent symbols in reel 3. These symbols can be considered as occupying both reels. The prize is now evaluated by outcome generator 630 and the player is paid for three Queens on the centre line.

Example 3

Figure 10:
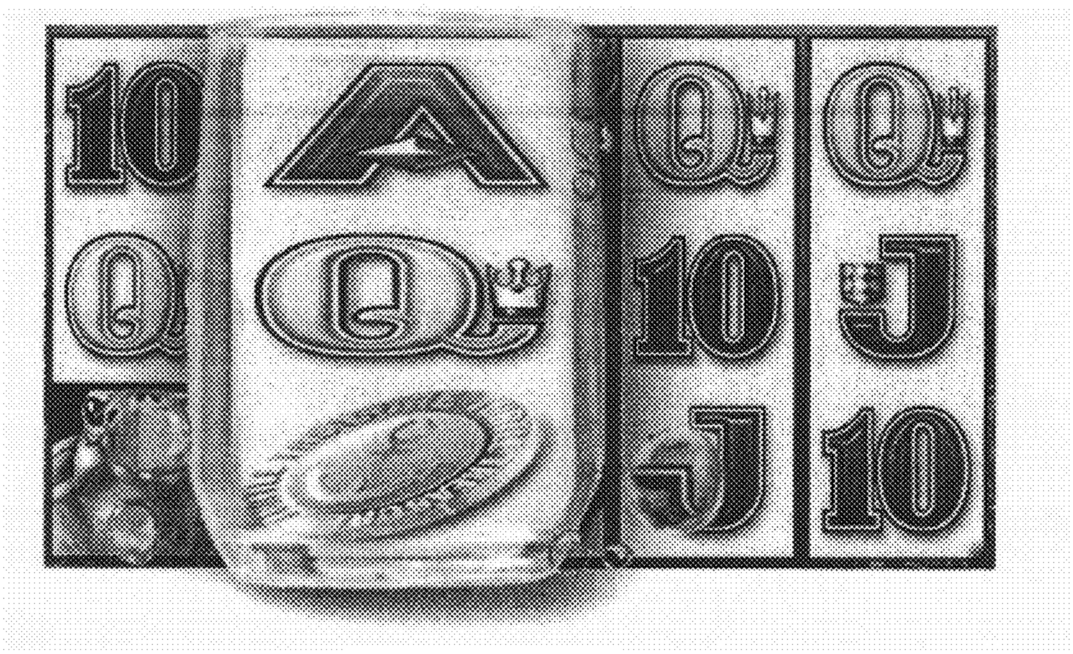
FIG. 10 shows the displays of Example 3.

Now referring to FIG. 10, another example is shown as a further variant on the play of example 1. The position controller 621 has placed the spirit glass in the same position as example 2, but this time the distortion controller 622 has made glass completely full of liquid. The glass full state acts to not only to allow all the symbols in reel 2 to be duplicated into reel 3, but also to double any prizes. The prize is now evaluated by outcome generator 630 and the player is paid twice the prize for the three Queens on the centre line.

It can also be seen in FIG. 10 that droplets of liquid are seen falling from the sides of the glass. In other embodiments the droplets can be larger and also lead to prizes. The glass may not necessarily be vertical. It can slant or spill, creating other illusions and producing distorting spillage that can generate special prizes and a sense of drunken enjoyment.

It will be appreciated that the invention is not restricted to a particular form of distorting element or a particular set of rules governing the distortion, the position of the distorting element, or its effect on the game outcome.

Persons skilled in the art will appreciate that the method of the embodiment could be embodied in program code. The program code could be supplied in a number of ways, for example on a computer readable medium, such as a disc or a memory (for example, that could replace part of memory 103) or as a data signal (for example, by downloading it by transmitting it from a server).

Persons skilled in the art will also appreciate that many variations may be made to the invention without departing from the scope of the invention. In particular, various of the above features may be combined to form alternative embodiments.

In the claims which follow and in the preceding description of the invention, except where the context indicates otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art in any country.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A method of gaming comprising:

selecting, using a processor, in each game round a plurality of symbols for display to a player in a set of display positions;

determining that a distorting element is to appear and in response, setting: 1) a position of the distorting element and 2) a modification state of the distorting element, wherein the modification state is selected from a range of possible states comprising: a first state in which none of the plurality of the symbols are modified; a second state in which some, but not all, of the plurality of the symbols are modified; and a third state in which all of the plurality of symbols are modified;

superimposing said distorting element over a plurality of the display positions at the set position and the set state so that the symbols underlying the distorting element can be modified according to the selected state; and determining, using the processor, an outcome for each game round based on the selected symbols as modified by the distorting element.

2. A method of gaming as claimed in claim 1 wherein the modification is based on a current state of a range of possible states of the distorting element.

3. A method of gaming as claimed in claim 2 wherein one or more game states influence the current state of the distorting element.

4. A method of gaming as claimed in claim 3 further comprising retaining the distorting element in a subsequent game round and wherein the one or more game states which influence the current state of the distorting element includes the game round outcome of a previous game round.

5. A method of gaming as claimed in claims 2, 3, or 4 wherein the distorting element is an image of a glass and the range of possible states of the distorting element comprises a range of levels of liquid in the glass optically distorting any symbols superimposed by the liquid.

6. A method of gaming as claimed in claim 5 wherein the range of possible states of the distorting element further comprises a range of positions of the glass.

7. A method of gaming as claimed in claim 5 wherein the range of possible states of the distorting element further comprises a range of tilting angles of the glass.

8. A method of gaming as claimed in claim 5 wherein the range of possible states of the distorting element further comprises an over-full state with distorting droplets escaping from the glass.

9. A method of gaming as claimed in claim 5 wherein range of possible states of the distorting element further comprises an empty state with no liquid and no optically distorted symbols.

10. A method of gaming as claimed in claim 2 wherein determining the outcome comprises determining whether any symbols are distorted so as to cover one or more adjacent display positions as well as an original display position and treating such symbols as occupying both the original and adjacent display positions.

11. A method of gaming as claimed in claim 2 wherein determining the outcome further comprises determining whether the liquid completely fills the glass, and adjusting prizes in response to the filled glass.

12. A method of gaming as claimed in claim 2 wherein determining that a distorting element should appear is controlled by a random event, player choice, or occurrence of a particular winning combination of symbols.

13. A method of gaming as claimed in claim 2 wherein the current state of the distorting element is influenced by a random event or player choice.

14. A gaming system comprising:

a display for symbols to be displayed at a set of display positions to a player;

a symbol selector for selecting in each game round a plurality of symbols for display to the player in a set of display positions;

a distorting element controller for determining that a distorting element is to appear and in response, setting: 1) a position of the distorting element and 2) a modification state of the distorting element, wherein the modification state is selected from a range of possible states comprising: a first state in which none of the plurality of the symbols are modified; a second state in which some, but not all, of the plurality of the symbols are modified; and a third state in which all of the plurality of symbols are modified and superimposing said distorting element over one or more of the display positions at the set position and the set state so that the symbols underlying the distorting element can be modified according to the selected state; and an outcome generator arranged to determine an outcome for each game round based on the selected symbols as modified by the distorting element.

15. A gaming system as claimed in claim 14 wherein the distorting element controller is arranged so that the modification is based on a current state of a range of possible states of the distorting element.

16. A gaming system as claimed in claim 15 wherein the distorting element controller is arranged so that one or more game states influence the current state of the distorting element.

17. A gaming system as claimed in claim 16 wherein the distorting element controller is arranged so that the distorting element can be retained in a subsequent game round and the one or more game states which influence the current state of the distorting element includes the game round outcome of a previous game round.

18. A gaming system as claimed in claim 15 wherein the distorting element controller is arranged so that the distorting element is an image of a glass and the range of possible states of the distorting element comprises a range of levels of liquid in the glass optically distorting any symbols superimposed by the liquid.

19. A gaming system as claimed in claim 18 wherein the distorting element controller is arranged so that the range of possible states of the distorting element further comprises a range of positions of the glass.

20. A gaming system as claimed in claim 18 wherein the distorting element controller is arranged so that the range of possible states of the distorting element further comprises a range of tilting angles of the glass.

21. A gaming system as claimed in claim 18 wherein the distorting element controller is arranged so that the range of possible states of the distorting element further comprises an over-full state with distorting droplets escaping from the glass.

22. A gaming system as claimed in claim 18 wherein the distorting element controller is arranged so that the range of possible states of the distorting element further comprises an empty state with no liquid and no optically distorted symbols.

23. A gaming system as claimed in claim 15 wherein the outcome generator is arranged to determine whether any symbols are distorted so as to cover one or more adjacent display positions as well as an original display position and to treat such symbols as occupying both the original and adjacent display positions in determining the outcome.

24. A gaming system as claimed in claim 15 wherein the outcome generator is arranged to determine whether the liquid completely fills the glass, and to adjust prizes in response to the filled glass.

25. A gaming system as claimed in claim 15 wherein the distorting element controller is arranged to determine that a distorting element should appear on the basis of one or more of a random event, player choice, or occurrence of a particular winning combination of symbols.

26. A gaming system as claimed in claim 15 wherein the distorting element controller is arranged so that the current state of the distorting element is influenced by one or more of a random event or player choice.

27. A game controller comprising:

a symbol selector for selecting in each game round on a gaming system a plurality of symbols for display to a player in a set of display positions on a display;

a distorting element controller for determining that a distorting element is to appear and in response, setting: 1) a position of the distorting element and 2) a modification state of the distorting element, wherein the modification state is selected from a range of possible states comprising: a first state in which none of the plurality of the symbols are modified; a second state in which some, but not all, of the plurality of the symbols are modified; and a third state in which all of the plurality of symbols are modified and superimposing said distorting element over one or more of the display positions at the set position and the set state so that the symbols underlying the distorting element can be modified according to the selected state; and an outcome generator arranged to determine an outcome for each game round based on the selected symbols as modified by the distorting element.

28. A game controller as claimed in claim 27 wherein the distorting element controller is arranged so that the modification is based on a current state of a range of possible states of the distorting element.

29. A game controller as claimed in claim 28 wherein the distorting element controller is arranged so that one or more game states influence the current state of the distorting element.

30. A game controller as claimed in claim 29 wherein the distorting element controller is arranged so that the distorting element can be retained in a subsequent game round and the one or more game states which influence the current state of the distorting element includes the game round outcome of a previous game round.

31. A game controller as claimed in claim 28 wherein the distorting element controller is arranged so that the distorting element is an image of a glass and the range of possible states of the distorting element comprises a range of levels of liquid in the glass optically distorting any symbols superimposed by the liquid.

32. A game controller as claimed in claim 31 wherein the distorting element controller is arranged so that the range of possible states of the distorting element further comprises a range of positions of the glass.

33. A game controller as claimed in claim 31 wherein the distorting element controller is arranged so that the range of possible states of the distorting element further comprises a range of tilting angles of the glass.

34. A game controller as claimed in claim 31 wherein the distorting element controller is arranged so that the range of possible states of the distorting element further comprises an over-full state with distorting droplets escaping from the glass.

35. A game controller as claimed in claim 31 wherein the distorting element controller is arranged so that the range of possible states of the distorting element further comprises an empty state with no liquid and no optically distorted symbols.

36. A game controller as claimed in claim 28 wherein the outcome generator is arranged to determine whether one or more symbols are distorted so as to cover adjacent display positions as well as an original display position and to treat such symbols as occupying both the original and adjacent display positions in determining the outcome.

37. A game controller as claimed in claim 28 wherein the outcome generator is arranged to determine whether the liquid completely fills the glass, and to adjust prizes in response to the filled glass.

38. A game controller as claimed in claim 28 wherein the distorting element controller is arranged to determine that a distorting element should appear on the basis of one or more of a random event, player choice, or occurrence of a particular winning combination of symbols.

39. A game controller as claimed in claim 28 wherein the distorting element controller is arranged so that the current state of the distorting element is influenced by one or more of a random event or player choice.

40. A game controller as claimed in claim 28 implemented by a processor executing program code stored in a memory.

41. A non-transitory computer readable medium including computer program code which when executed by a processor causes the processor to implement a method of gaming, the method comprising:

selecting in each game round a plurality of symbols for display to a player in a set of display positions;

determining that a distorting element is to appear and in response, setting: 1) a position of the distorting element and 2) a modification state of the distorting element, wherein the modification state is selected from a range of possible states comprising: a first state in which none of the plurality of the symbols are modified; a second state in which some, but not all, of the plurality of the symbols are modified; and a third state in which all of the plurality of symbols are modified;

superimposing said distorting element over a plurality of the display positions at the set position and the set state so that the symbols underlying the distorting element can be modified according to the selected state; and determining an outcome for each game round based on the selected symbols as modified by the distorting element.

* * * * *